(12) United States Patent
White

(10) Patent No.: US 7,514,691 B2
(45) Date of Patent: Apr. 7, 2009

(54) SOLID STATE IONISING RADIATION DETECTOR AND METHOD

(75) Inventor: Graham White, Abingdon (GB)

(73) Assignee: Oxford Instruments Analytical Limited, Oxon (GB)

( * ) Notice: Subject to any disclaimer, the term of this patent is extended or adjusted under 35 U.S.C. 154(b) by 252 days.

(21) Appl. No.: 11/420,856

(22) Filed: May 30, 2006

(65) Prior Publication Data

US 2007/0290141 A1 Dec. 20, 2007

(51) Int. Cl.
*G01T 1/24* (2006.01)

(52) U.S. Cl. .............................. 250/370.14; 250/370.13

(58) Field of Classification Search ............ 250/370.14, 250/370.13
See application file for complete search history.

(56) References Cited

U.S. PATENT DOCUMENTS 6,153,883 A    11/2000  Arai
6,175,120 B1 *  1/2001  McGregor et al. ..... 250/370.13

OTHER PUBLICATIONS

Luke et al. Amorphous Ge bipolar blocking contacts on Ge detectors, IEEE Transactions on Nuclear Science, vol. 39, No. 4 (Aug. 1992), pp. 590-594.*

Rossington, C.S. et al., "Large Area, Low Capacitance Si(Li) Detectors for High Rate X-Ray Applications", IEEE Transactions on Nuclear Science, Aug. 1993, pp. 354-359, vol. 40, No. 4.

Tikkanen, T. et al., "Characterising a Si(Li) detector for the SIXA X-ray spectrometer", Nuclear Instruments and Methods in Physics Research, Feb. 17, 1997, pp. 329-335, vol. A 390, Elsevier Science B.V.

Cox, Christopher E. et al., "Improvement in the low energy collection efficiency of Si(Li) X-ray detectors", Nuclear Instruments and Methods in Physics Research, Aug. 15, 2005, pp. 436-440, vol. B 241, Elsevier Science B.V.

Goulding, F.S. et al., "Detector Background and Sensitivity of Semiconductor X-Ray Fluorescence Spectrometers", Advances in X-Ray Analysis, pp. 470-482, vol. 15, Plenum Publishing Company, New York, New York, 1972.

* cited by examiner

*Primary Examiner*—David P Porta
*Assistant Examiner*—Shun Lee
(74) *Attorney, Agent, or Firm*—Vern Maine & Associates

(57) ABSTRACT

A solid state ionizing radiation detector is provided, having an absorber within which, when in use, electrical charge is generated upon the absorption of ionizing radiation. The absorber has a front face with an active region through which incident ionizing radiation is received. A front electrode is located at the front face. A rear electrode substantially covers a rear face of the absorber. The front and rear electrodes are arranged in use to generate an electric field in the absorber so as to collect the generated electrical charge. The area of the rear face is substantially smaller than that of the active region of the front face. At least part of the absorber within which the electric field is generated is bounded by substantially smooth and substantially tapered sidewalls.

12 Claims, 5 Drawing Sheets

SOLID STATE IONISING RADIATION DETECTOR AND METHOD

FIELD OF THE INVENTION

The present invention relates to a solid state ionizing radiation detector, together with a method of making such a detector.

BACKGROUND OF THE INVENTION

Solid state x-ray detectors known in the art work by collecting the charge liberated when an x-ray photon is absorbed within the active volume of the detector. An electric field is used to drive the charge towards a readout electrode and the induced signal on the electrode is essentially proportional to the energy of the incident photon. In a common configuration, there are two parallel electrodes at the front and rear of the device and a collimator on the front of the device that defines the entrance area for incident x-rays. A voltage difference applied between front and back electrodes provides the field to collect liberated charge. The front electrode is made thin enough so that x-rays easily penetrate through to the active volume where the field is established.

A photon is first absorbed by the photoelectric process within the active volume. The subsequent cascade of interactions produces a number of electron-hole pairs in proportion to the photon energy. Electrons and holes are swept in opposite directions by the field and induce a signal on the read-out electrode. During this process, the charge clouds expand by diffusion and electrostatic repulsion.

Solid state detectors have been made from high purity silicon (see for example U.S. Pat. No. 6,153,883) and other materials such as high purity germanium, CdTe, CdHgTe, CdZnTe can be used. Various materials and implanted atoms can be used to form the electrical contacts. Also, different shapes can be used to define the periphery of the detector. One well established type of detector is made from Lithium-compensated Si (so called "Si(Li)") and detectors of this type with "top-hat", "grooved" and "planar" geometry are known particularly from F. S. Goulding et al. ("Detector Background and Sensitivity of Semiconductor X-ray Fluorescence Spectrometers", Advances in X-ray Analysis, Vol. 15, 1972, pp. 470-482).

For high sensitivity, it is desirable to have a large area for x-ray detection. However, when the active area of a solid state detector is increased, this increases the electrical capacitance between front and back electrodes. Rossington et al. ("Large Area, Low Capacitance Si(Li) Detectors for High Rate X-Ray Applications", C. S. Rossington et al., IEEE transactions on Nuclear Science, vol. 40, No. 4, August 1993, pp 354-359), explain that electronic noise increases with increased detector capacitance so that detector energy resolution can be improved by reducing capacitance.

FIG. 1 shows a cross section of a typical grooved structure Si(Li) detector as described by Rossington et al or Goulding et al. FIG. 1 shows a section through the centre of the detector crystal 1 that is typically a circular disk a few mm in thickness. The front contact (electrode) 2 for these type of detectors typically involves a thin metal conductive coating and a number of options have recently been discussed by Cox et al (Nucl. Instr. and Meth. in Phys. Res. B, 241, (2005), 436-440). The rear contact (electrode) 3 is typically formed by diffusing Li into the silicon wafer prior to cutting out the shape of the crystal. The diffused Li region forms a conductive layer and a potential difference of typically a few hundred volts to a thousand volts is applied between the front and back contacts. This potential difference produces a semiconductor depletion zone 4 between the electrodes where the silicon behaves more like an insulator. The depletion zone extends to the front of the detector and throughout the Li-compensated silicon. The compensated region is typically limited in extent at the sides of the detector and the uncompensated silicon constitutes most of the undepleted silicon 5 around the periphery of the detector that is effectively conductive and connected electrically to the front contact. Within the depletion zone, there is a strong field, shown by arrows and equipotential field lines in FIG. 1. An x-ray (generally indicated at 6) passing through the aperture defined by the entrance collimator 7 penetrates through the front contact 2 to reach the depleted silicon and liberate charge. For a single x-ray photon absorbed near the front contact, the liberated charge cloud of electrons is swept towards the back contact 3. By the time it reaches the back contact, the charge cloud may have spread to reach dimensions of the order of 100 μm according to Goulding et al. The movement of charge in the field induces a signal on the back contact. The back contact is typically connected to the gate electrode of a field effect transistor in the first stage of a charge sensitive amplifier for the signal. The noise and resolution of such a detector is influenced by the capacitance between the back electrode 3 and the front electrode 2 which is effectively connected to the undepleted silicon at the periphery. For the example shown in FIG. 1 where the distance between front and back electrodes is about 3 mm and the back contact is about 6 mm in diameter, the capacitance is about 0.94 pF.

One approach to reducing capacitance is to reduce the size of the readout anode. Tikkanen et al (Nucl. Instr. and Methods, A 390, 3 (1997) 329-335) describe a Si(Li) detector where the anode side of the crystal has a smaller diameter to reduce the readout capacitance. This is shown schematically in FIG. 2 (with analogous reference numerals as for FIG. 1). For this device, x-rays entering at the extreme periphery of the device showed evidence of tailing due to poor charge collection but x-rays entering most of the area of the front face produce acceptable tailing. However, if the back contact anode is made much smaller, this continues to reduce capacitance but increases the region of poor charge collection. FIG. 3 shows the same detector design as for FIG. 1 but with a back contact 3 that is only 3 mm in diameter. In this case, the capacitance is reduced to 0.62 pF but there are now very weak field regions near the readout electrode indicated by "W" in FIG. 3. For a photon absorbed in these regions, there is no strong field to sweep the charge quickly towards the anode and therefore an increased chance that some electrons will be trapped or recombine before they are collected. If an x-ray is absorbed near the front contact 2, Goulding et al explain that the expanding electron charge cloud will be large by the time it reaches the back of the detector and some of the cloud may fall in this weak field region "W". Either effect results in a signal measurement well below the correct value and this degraded measurement will appear in the tail or background on the low energy side of the spectral peak corresponding to the incident photon energy. Goulding et al show that poor charge collection can be improved compared to a "top-hat" detector by using an earthed "guard ring" around the anode. However, with this "guard ring" approach, the field is essentially the same as in FIG. 1 so charge liberated by x-rays incident on the front face opposite the guard ring at the back will not reach the anode. Thus, the active area on the front face is simply reduced in proportion to the reduction in capacitance.

In order to retain the large front active area for detection with a small detector capacitance, Rossington et al describe a detector with a small back electrode where the front face electrode is effectively extended around to the sides. FIG. 4 shows this schematically. Starting with a conventional grooved Si(Li) structure, a cylindrical piece is cut out of the centre. The Li-diffused back contact, is cut away to 0.5 mm depth to substantially reduce the diameter of the back contact. In addition, the front face is either beveled or radiused to remove sharp edges to form the shape shown in FIG. 4. A Pd p contact is deposited on the front and side surfaces to act as the front entrance window and the back surface outside the small anode contact is passivated by coating with polyimide to form the device shown in FIG. 4. By extending the contact around to the sides, this structure improves on that of FIG. 3 because there is now a strong field towards the readout anode even at the back of the device. However, there are many processing steps required and since the side walls of the final device are extremely fragile, this makes handling and assembly difficult in practice.

It is therefore desirable to provide a detector having improved performance and easier manufacturability with respect to that of the prior art.

SUMMARY OF THE INVENTION

In accordance with a first aspect of the present invention we provide a solid state ionising radiation detector comprising:
an absorber within which, when in use, electrical charge is generated upon the absorption of ionising radiation, the absorber having a front face with an active region through which incident ionising radiation is received, and a rear face;
a front electrode located at the front face; and
a rear electrode substantially covering the rear face;
wherein the front and rear electrodes are arranged in use to generate an electric field in the absorber so as to collect the said electrical charge,
wherein the area of the rear face is substantially smaller than that of the active region of the front face and wherein at least part of the absorber within which the electric field is generated is bounded by substantially smooth and substantially tapered sidewalls.

The invention therefore achieves improved performance with respect to the prior art by the use of a detector crystal having smooth tapered sidewalls where the rear face of the absorber has a substantially smaller area than that of the active region of the front face through which the ionising radiation is received. This allows the rear electrode size to be reduced whilst avoiding the generation of a zone of weak electric field near this electrode.

The ionising radiation is typically x-ray radiation although the invention is also applicable to gamma rays.

The rear face is substantially smaller in area than the front face, and in particular, the active region thereof. Preferably the rear face is substantially planar. Likewise at least the active part of the front face is also preferably planar. Typically the front and rear planar faces are arranged substantially parallel to one another in an opposed manner. The parts of the electrodes in contact with the front and rear faces are typically conformal with the said faces. Whilst it is advantageous to provide a thin front electrode to allow passage of the ionising radiation, the geometry of the rear electrode is not so constrained.

The tapering of the sidewalls provides a beneficial electric field in the region of the sidewalls. In the context of the invention, "tapered" is intended to mean a shape with a generally increasing cross-section (from the rear towards the front of the absorber) although this is not limited to having a constant tapering gradient. Whilst the gradient may be constant (linear taper), alternatively it may exhibit a variation along the sidewalls so as to produce a smoothly curved geometry in cross-section. The general aim of the tapering is to reduce the size of the rear electrode whilst avoiding the production of a weak electric field zone nearby. Preferably the part of the absorber having the tapered sidewalls is adjacent to the rear electrode.

The active region of the front face, and the rear face, typically have a similar geometry, with the active region of the front face being a scaled up analogue of the rear face. The faces may exhibit rotational symmetry when viewed along a direction normal to their surfaces, such as circular, oval, or other shapes. It is however undesirable to use a geometry having sharp edges. Preferably with circular symmetry for the front and read faces, when aligned upon a nominal central axis, the sidewalls are substantially frusto-conical. It is also preferred that the sidewalls are electrically non-conductive so as to provide an electric field with beneficial properties for sweeping electrical charge between the electrodes.

Various different geometries of detector are known in the art, these including "grooved" detectors which have a peripheral groove extending from the rear face towards the front face and bounding the active volume of the absorber within which he charge is liberated. In a "grooved" arrangement of the detector of the invention, the absorber is provided with a peripheral groove defining a central region within which the ionising radiation is absorbed. The groove has inner walls bounding the central region and outer walls opposing the inner walls. The sidewalls are formed as the inner walls.

The particular type of absorber material used is dependent upon the type of ionising radiation being detected. Typically, for the detection of x-rays at least, the absorber is a semiconductor crystal, preferably a single crystal.

Although in principle applicable to other absorber types, with the use of a semiconductor material as the absorber, the rear electrode can be formed from an extension to the absorber crystal, doped with a material so as to provide the extension with electrical conductivity. In the case of a silicon absorber, the doping may be achieved with lithium.

In accordance with a second aspect of the present invention we provide a method of manufacturing an ionising radiation detector according to the first aspect of the invention. The method comprises obtaining a body of absorber material; removing material from the body so as to generate the front and rear faces wherein the area of the rear face is substantially smaller than the area of the active region of the front face, and so as to generate substantially smooth and substantially tapered sidewalls; and, providing the front and rear faces with the respective front and rear electrodes, wherein the rear electrode substantially covers the rear face.

The material can be removed from the body using a number of different methods including mechanical removal (such as drilling, cutting or milling), chemical etching or ion etching. In the case of a detector with a circular active region and circular rear face, the mechanical removal of material may be performed with a frusto-conical cutting tool. The method can be performed upon absorbers formed from a number of different materials, such as semiconductor crystals. When a semiconductor absorber is used, preferably the method further comprises etching and passivating the sidewalls.

When the rear electrode is formed from the absorber material, the rear electrode may be formed by diffusing a chemical species into the semiconductor material. It may also be formed by ion implantation. The front electrode, and in particular the active region of the front electrode (through which the ionising radiation is received) may be likewise formed by diffusing a chemical species into the semiconductor material. As a further alternative the front or rear electrode may be formed by coating it with a metal (Schottky contact). The rear electrode may be formed either before or after the step of removing the material to form the smooth and tapered sidewalls.

A number of different detector absorber geometries may be used, these including a grooved structure or a more simple "top-hat" structure where the front face is extended beyond the active region. A collimator may also be provided to limit the incidence of ionising radiation to the active region.

BRIEF DESCRIPTION OF THE DRAWINGS

An example of a solid state detector and method according to the present invention is now described with reference to the accompanying drawings, in which.

DETAILED DESCRIPTION

Figure 5:
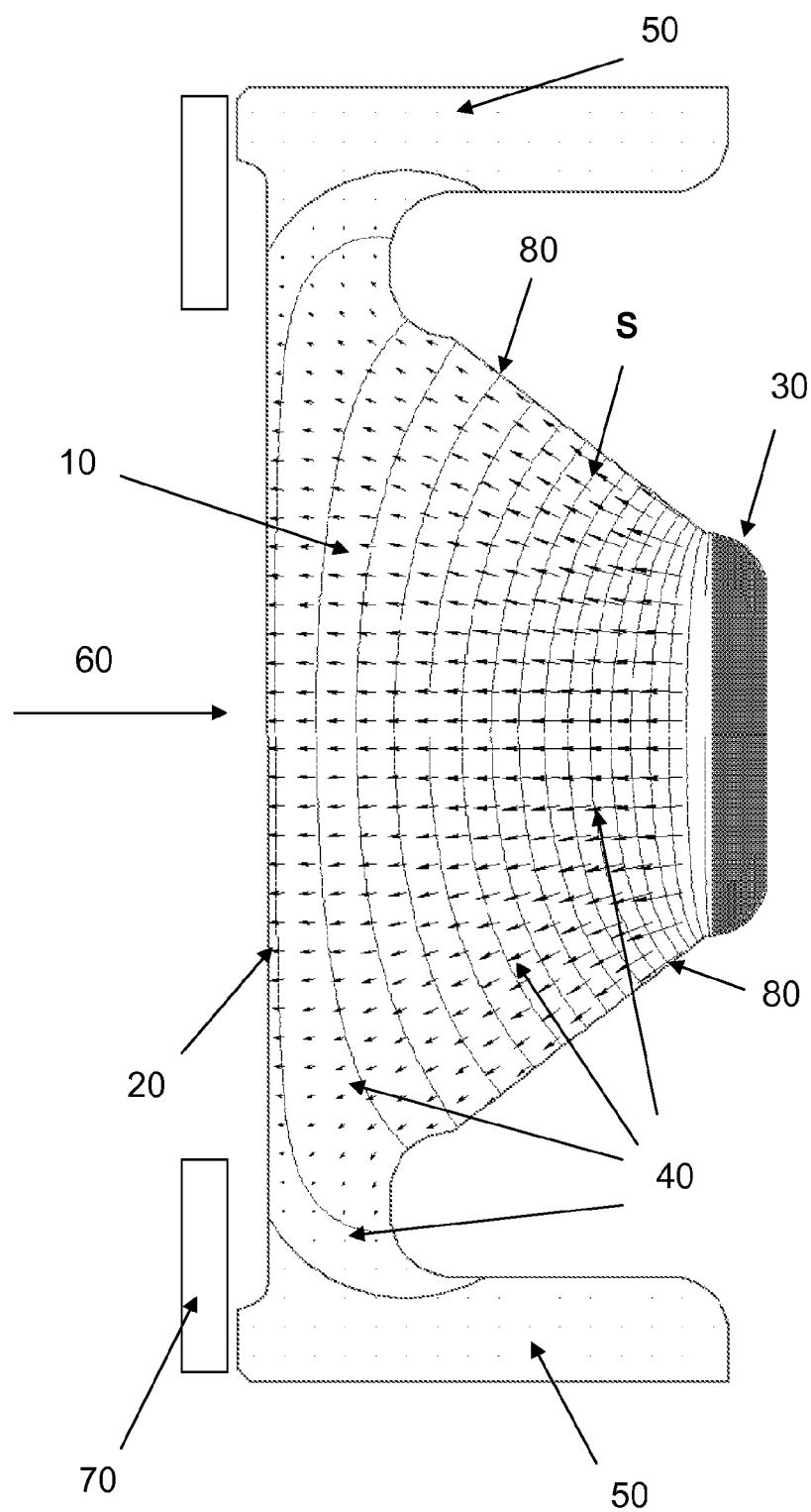
FIG. 5 shows an example detector, partly in section, according to the invention; and, FIGS. 6(a), 6(b) and 6(c) show major steps in an example method of manufacturing a detector according to the invention.

An example of a detector according to the invention is shown in FIG. 5. FIG. 5 shows, partly in section, a "grooved" Si(Li) detector having an absorber in the form of a detector crystal 10. This is a circular disk a few mm in thickness. The crystal has front and rear planar opposed faces. In a similar manner to known detectors a front electrode 20 is formed from a thin electrically conductive coating applied across the front face of the absorber crystal.

A rear electrode 30 is formed by diffusing lithium into the silicon wafer prior to cutting out the shape of the crystal absorber. The application of a potential difference between the front and rear electrodes produces a semiconductor depletion zone 40 which extends to the front of the detector and throughout the Li-compensated silicon. The region of intersection of the depleted region with the front surface approximately defines the extent of the active region of the front surface. If a collimator is present, as is the case in FIG. 5 at 70, then the active region is that part of the front face upon which ionising radiation is incident when in use.

At the periphery of the compensated region, and beyond the active region at the front face, an effectively conductive region of undepleted silicon 50 is located. This is in electrical contact with the front electrode. Within the depletion zone, there is a strong field, shown by arrows and equipotential field lines. X-rays which are incident upon the detector enter the detector in the direction indicated at 60 and liberate charge upon interaction with the depleted silicon in the known manner.

Figure 1:
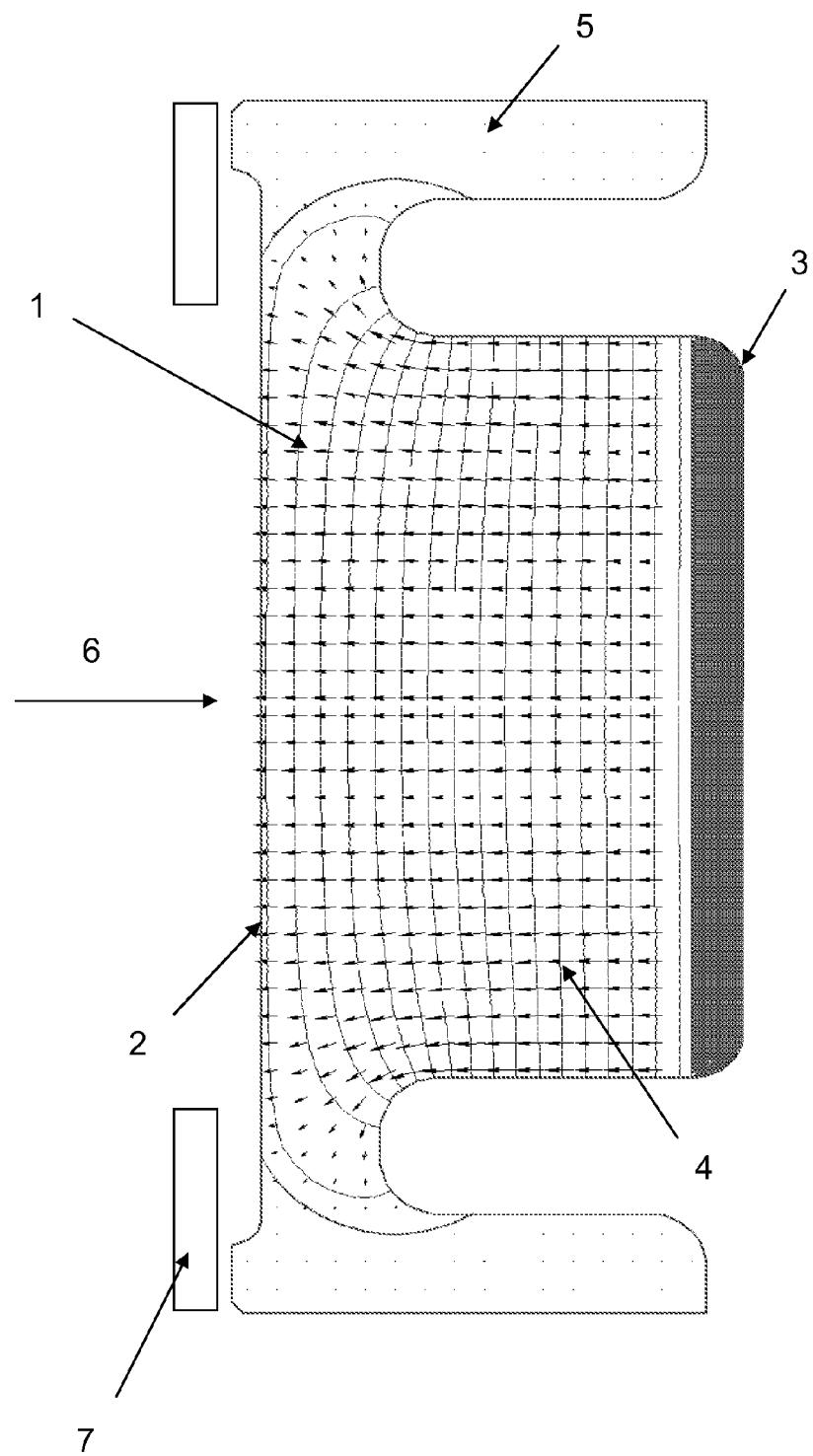
FIG. 1 shows a prior art grooved detector, partly in section.
Figure 3:
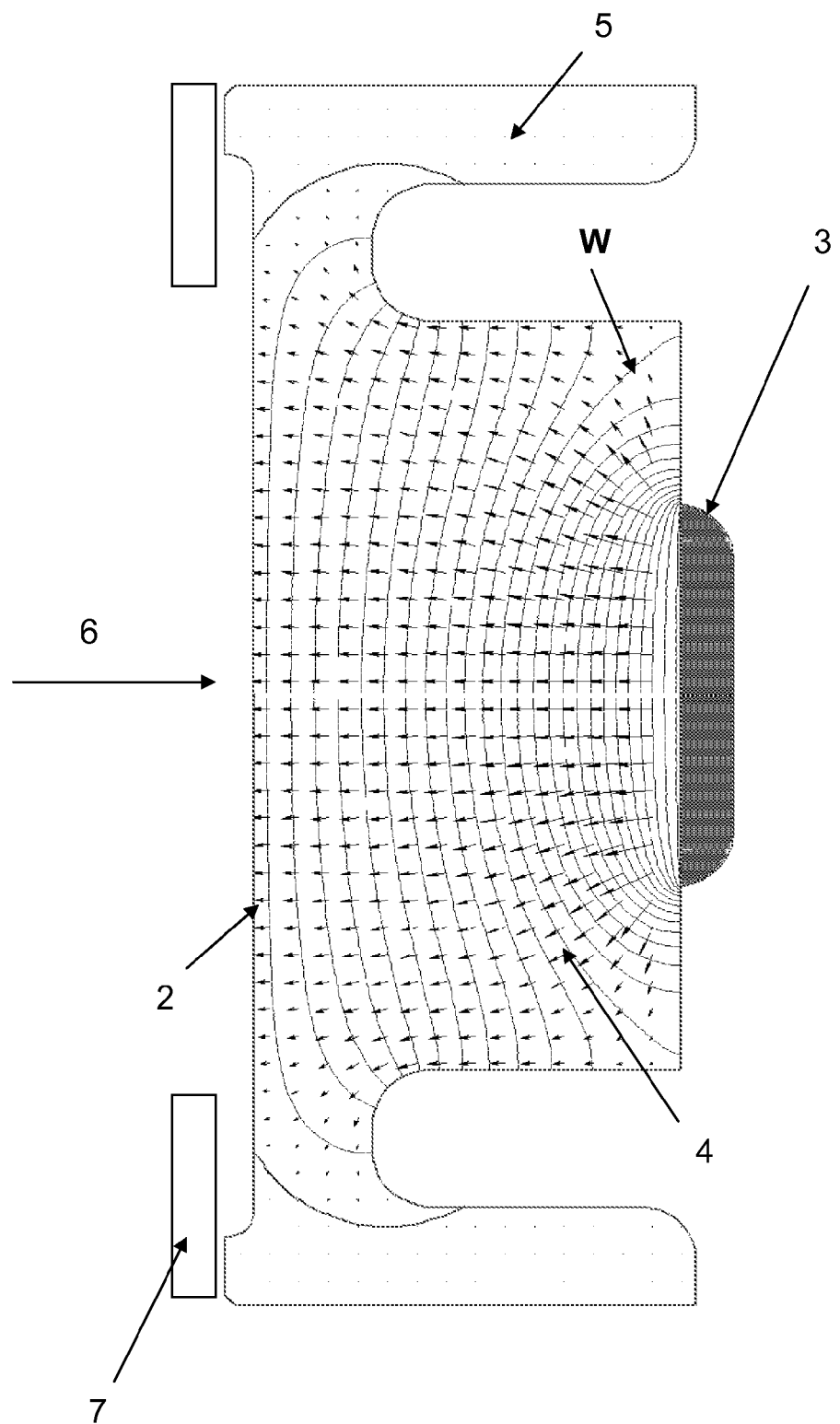
FIG. 3 shows a prior art "grooved" detector, partly in section, with a small rear electrode.

The object of the invention, namely improvement in detector performance, is achieved with a detector crystal having smooth tapered sidewalls (shown at 80). The rear electrode 30, as a readout anode, covers the whole rear face. Each of the rear face and the rear electrode therefore have a substantially smaller area than the active region of the "entrance" front electrode 20. All the material that is not adjacent to the back contact has been removed and there are smooth tapered sidewalls that extend towards the larger diameter front of the detector. As with prior art Si(Li) detectors, the sidewalls are passivated to render them non-conductive so that they can sustain a high field near to the surface. The effect of the modified shape is to strengthen the field significantly along the surface near the periphery of the rear electrode, as shown by "S" in FIG. 5. This resolves the charge collection problems of prior art designs such as FIG. 3. The capacitance is 0.49 pF which is less than that of the prior art example of FIG. 3. This value is much less than the 0.94 pF of the device in FIG. 1, which has essentially the same front active area. Thus the goal of reducing capacitance while maintaining large active area and good charge collection is achieved. The structure of FIG. 5 can also be achieved with a simpler processing sequence than described by Rossington et al (discussed above in relation to FIG. 4) and the final device has the advantage that the undepleted silicon at the periphery can be used to grasp the device without contacting the critical surfaces.

Figure 2:
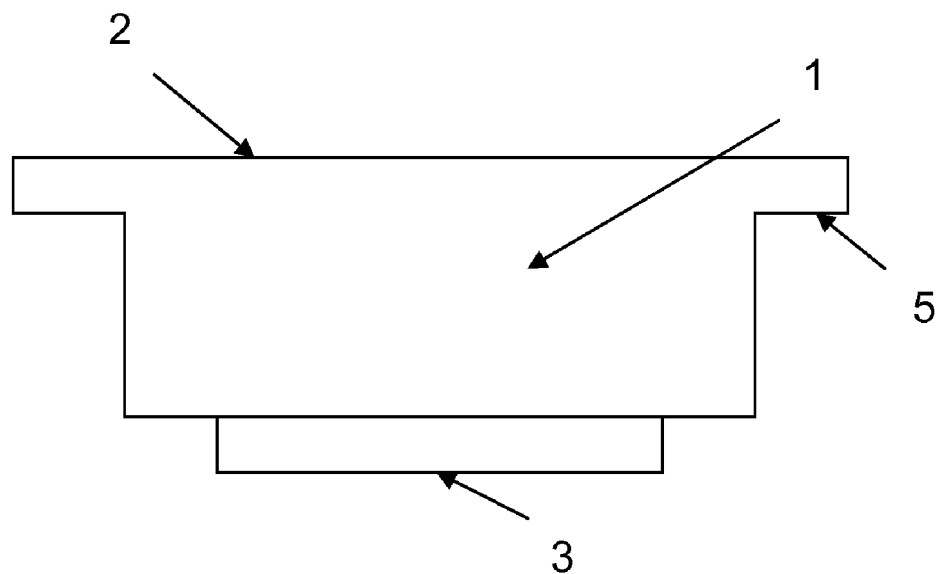
FIG. 2 shows a prior art "top hat" detector, partly in section, with a small rear electrode.

A variant of this shape, to which the invention can be applied, is the "top-hat" structure shown in Goulding et al (or Tikkanen et al as shown in FIG. 2) where the outer regions beyond the groove are not present but there is still a peripheral ring of undepleted Si around the front contact.

Thus the invention provides an improvement to the design and manufacture of radiation detectors which offers increased active area with no significant degradation of noise and charge collection performance.

Figure 6:
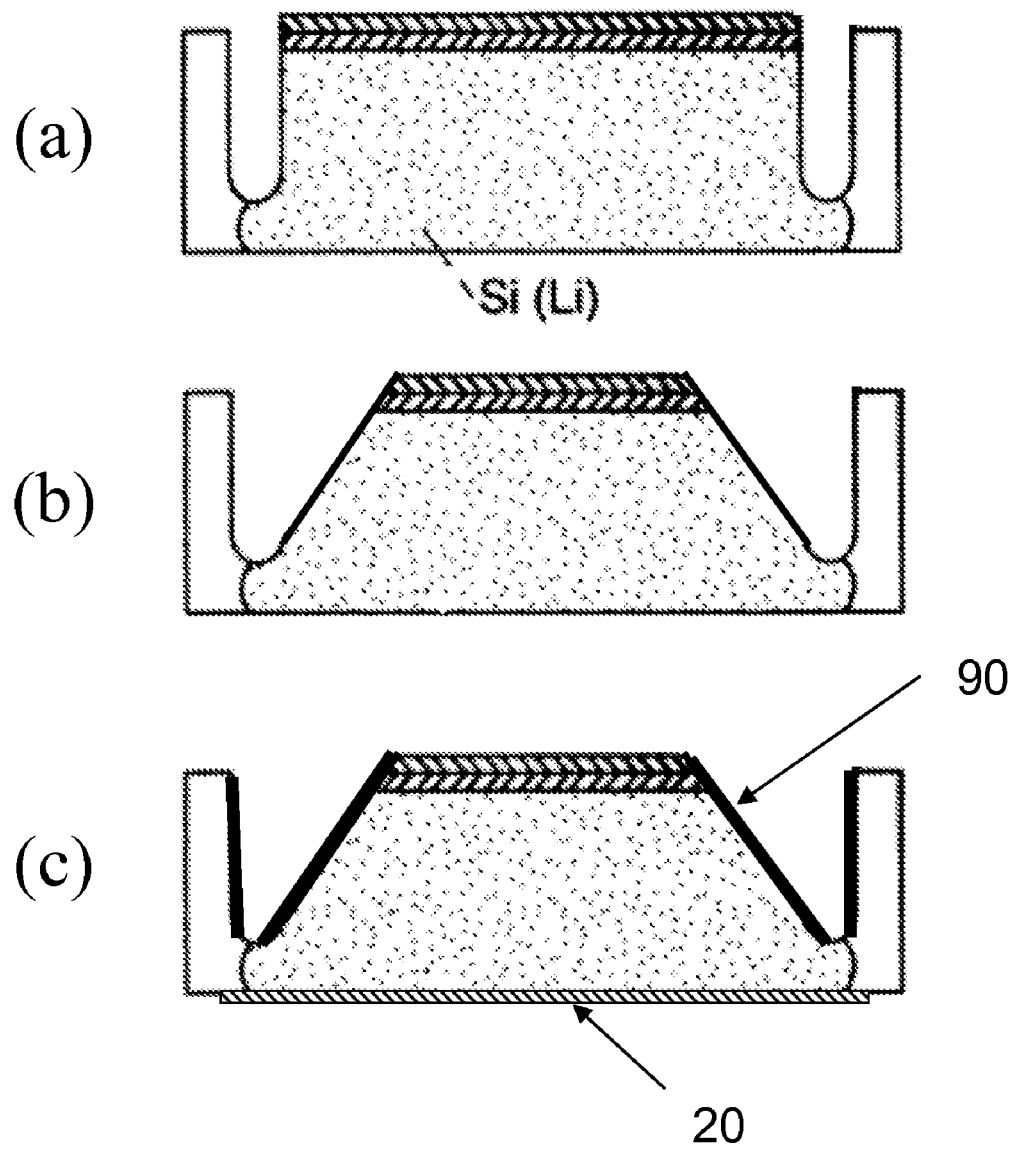

A method of manufacturing an ionising radiation detector according to the invention is shown in FIG. 6.

A conventional grooved Si(Li) crystal is made with a Li-diffused back contact (FIG. 6(a)). A special drill bit is then used to cut a conical surface that reduces the size of the rear face and produces a smooth surface extending away from this towards the front face (FIG. 6(b)). This produces the sloping sidewalls. Alternatively, these could be created with chemical etching or deep reactive ion etching. The sloping side walls are then etched and passivated (shown at 90) using the same process that would be used for the side walls for a conventional grooved Si(Li) structure. A conventional front contact electrode for use with a conventional grooved Si(Li) detector is then applied to the front face to produce the structure shown in FIG. 6(c). This has essentially the same front face area as the unmodified grooved Si(Li) detector but has significantly reduced capacitance. The complete detector is then finished using conventional processing steps, these including connecting electrical wiring to the electrodes and housing the structure.

Figure 4:
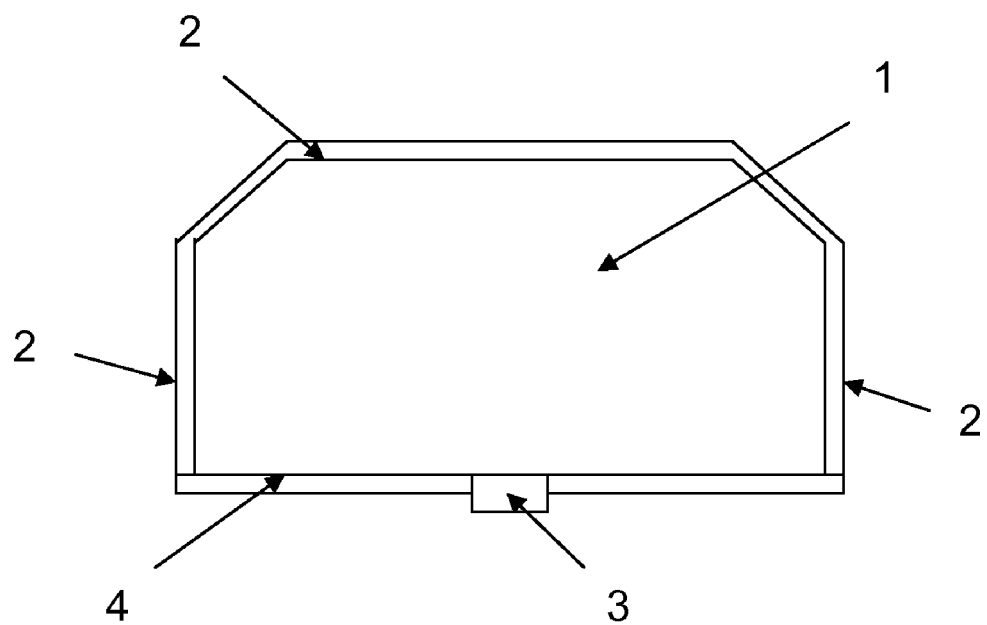
FIG. 4 shows a prior art detector, partly in section, having a front electrode extended around the sidewalls.

The process steps described above are simpler than those described by Rossington et al (in relation to FIG. 4). As a further advantage, the final crystal is compatible with the same handling and mounting arrangements as would be used for a prior art Si(Li) crystal.

Different geometries of taper can be used on the side walls. A shallow taper only produces a slight reduction in capacitance. The taper does not have to reach the "bottom" of the groove. However, the preferred embodiment uses a taper that almost reaches the bottom of the groove so that when the normal etching processes are used to prepare the side walls for passivation, the cross section is similar to that shown in FIG. 5 where the distance from the front surface to the rear contact electrode is about 3 mm. In this case, the crystal can have an active front face area of 30 mm$^2$ but with a capacitance as small as that of a conventional grooved Si(Li) detector with only 10 mm$^2$ active area. Thus, for example a 30 mm$^2$ active area detector can be manufactured that has essentially the same electronic noise and energy resolution as a prior art 10 mm² detector. This improves sensitivity by a factor of three with no penalty in spectral quality.

It should be noted that because material has been removed from the back of the detector, high energy x-rays entering the front face may now penetrate through the side wall and go undetected. However, only about 2% of 10 keV x-rays will penetrate 0.5 mm and this is not enough to reach the tapering wall of FIG. 5. As a result, such a detector will not show any loss of efficiency for x-rays below 10 keV in energy. Therefore, the invention is particularly useful for low energy x-ray analysis.

In FIG. 6, the taper is applied after the Si crystal has been Li-compensated. In an alternative embodiment, the taper is applied to the crystal before it is subjected to the conventional Li-compensation process.

The same tapering principle can be used with other detector materials such as high purity silicon. In this case, the process is similar to that in FIG. 6(*a*) but the starting crystal is now purified silicon rather than Li-compensated silicon and the back contact can be either diffused Li or could be an implanted contact such as that described in U.S. Pat. No. 6,153,883. Similarly, high purity germanium or other materials such as CdTe, CdHgTe, CdZnTe could be used. The front contact could also be ion implanted.

Whereas FIG. 6(*a*) shows a grooved structure, the starting point can alternatively be a "top hat" structure as shown in Goulding et al for example and the final crystal still has peripheral regions around the rim of the front face that can be used for handling.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A solid state ionising radiation detector comprising:
    a silicon-based absorber within which, when in use, electrical charge is generated upon the absorption of ionising radiation, the absorber having a front face with an active region through which incident ionising radiation is received, and a rear face;
    a front electrode located at the front face; and
    a rear electrode substantially covering the rear face;
    wherein the front and rear electrodes are arranged in use to generate an electric field in the absorber so as to collect said electrical charge,
    wherein said front and rear electrodes are the only electrodes defining said electric field throughout said absorber between said active region and said rear face;
    wherein the area of the rear face is substantially smaller than that of the active region of the front face and wherein at least part of the absorber within which the electric field is generated adjacent said rear face is bounded by substantially smooth, substantially electrically non-conductive, and substantially tapered sidewalls.

2. A detector according to claim 1, wherein the detector is an x-ray detector.

3. A detector according to claim 1, wherein the front and rear faces are substantially planar.

4. A detector according to claim 1, wherein the front and rear faces are substantially parallel.

5. A detector according to claim 1, wherein the sidewalls are substantially frusto-conical.

6. A detector according to claim 1, wherein the sidewalls extend most of the distance between the front and rear electrodes.

7. A detector according to claim 1, wherein the part of the absorber having the substantially smooth and tapered sidewalls is located adjacent the rear electrode.

8. A detector according to claim 1, wherein the absorber is provided with a peripheral groove defining a central region within which the ionising radiation is absorbed, the groove having inner walls bounding the central region and outer walls opposing the inner walls and wherein the sidewalls are formed as the inner walls.

9. A detector according to claim 1, wherein the absorber is a semiconductor crystal.

10. A detector according to claim 9, wherein the rear electrode comprises an extension to the absorber crystal, doped so as to provide the extension with electrical conductivity.

11. The detector according to claim 1 wherein said detector is configured without intermediate electrodes positioned to influence said electric field.

12. The detector according to claim 1 wherein said sidewalls have a continuous surface.

* * * * *